United States Patent
McGregor

(10) Patent No.: US 7,039,317 B2
(45) Date of Patent: May 2, 2006

(54) RECONFIGURABLE NODE FOR A HYBRID FIBER CABLE NETWORK

(75) Inventor: Marlin McGregor, Berwyn, PA (US)

(73) Assignee: General Instrument Corporation, Horsham, PA (US)

( * ) Notice: Subject to any disclaimer, the term of this patent is extended or adjusted under 35 U.S.C. 154(b) by 690 days.

(21) Appl. No.: 10/304,595

(22) Filed: Nov. 25, 2002

(65) Prior Publication Data
US 2004/0101304 A1   May 27, 2004

(51) Int. Cl.
*H04J 14/00* (2006.01)

(52) U.S. Cl. .............................. 398/71; 398/70; 398/72; 398/66; 398/67; 398/68; 398/79; 455/3.1; 455/5.1; 455/6.1; 725/129; 725/119; 725/127; 725/114; 725/149; 725/120; 725/111; 725/126; 725/105; 370/352; 370/389; 370/476; 370/400; 370/535; 370/474

(58) Field of Classification Search ............... 398/70, 398/71, 72, 66, 67, 79, 68; 455/3.1, 5.1, 455/6.1; 725/129, 119, 127, 114, 149, 120, 725/111, 126, 105; 370/352, 389, 476, 400, 370/535, 474
See application file for complete search history.

(56) References Cited

U.S. PATENT DOCUMENTS 6,577,414 B1 * 6/2003 Feldman et al. ............ 725/129
6,751,417 B1 * 6/2004 Combs et al. ................ 398/71

* cited by examiner

*Primary Examiner*—Hanh Phan
(74) *Attorney, Agent, or Firm*—Akin Gump Strauss Hauer & Feld, LLP

(57) ABSTRACT

A reconfigurable node for a hybrid fiber cable network includes fiber slots housing a transmitter or receiver interfacing to a head end, coax slots housing an RF brick interfacing with subscribers and RF plug-in modules providing connectivity between the fiber and coax slots. The plug-in modules include connection points, for connection to a fiber or coax slot. A fiber impedance element, associated with the transmitter or receiver in that fiber slot, is connected to each fiber slot. Each fiber impedance element has a different impedance value. A coax impedance element, associated with the RF brick in that coax slot, is connected to each coax slot. Each coax impedance element has a different impedance value. An impedance sensing circuit detects a DC level associated with each connection point which corresponds with the impedance element in a respective fiber or coax slot to determine the location of transmitters, receivers or RF bricks.

5 Claims, 3 Drawing Sheets

RECONFIGURABLE NODE FOR A HYBRID FIBER CABLE NETWORK

BACKGROUND OF THE INVENTION

1. Field of the Invention

The present invention relates generally to element management in hybrid fiber cable ("HFC") networks and, more particularly, to detecting nodal connections that define an RF signal path in a field configurable, multi-module HFC network.

2. Background Information

Element management systems in HFC networks are generally known in the art. Element management systems, among other things, report to the end user how nodes within the system are configured. For example, it is often desirable to know what components are in place at a node, if those components are operating properly, and the signal path through the node.

Some HFC networks must adhere to the Hybrid Management Sublayer ("HMS") element management standard, which requires that the signal path from input to output of a node must be reported to the element management system of the HFC network. In conventional, non-reconfigurable HFC networks, the configuration of individual nodes does not change. That is, the components which make up each node are always in the same location, and a user is unable to change the configuration of a node in the field. Therefore, the signal paths through and within that node always remain the same. Thus, information about an individual node in a non-reconfigurable system may be hard coded or hard wired (i.e., permanently connected), such that the element management system for the HFC network always knows the status, configuration and/or signal path in that node. As a result, non-reconfigurable HFC networks do not have difficulty meeting the HMS signal path requirement since the node configuration reported to the element management system never changes.

In some HFC networks, however, it is desirable to use reconfigurable nodes. A reconfigurable node allows the user to interchange the components which comprise the node to effect various nodal connections between two or more points on either side of the node. A field reconfigurable fiber node includes RF plug-ins which a user or technician can install, remove or replace according to the desired nodal configuration. However, to remain HMS compliant, an HFC network with reconfigurable nodes must be able to report the signal path through the to the element management system, even when the node configuration changes. Since the node configuration may change in the field, hard wiring the node configuration to the element management system is not possible. Thus, there is a need to develop a field reconfigurable node for an HFC network which is also HMS compliant.

BRIEF SUMMARY OF THE INVENTION

A reconfigurable node for a hybrid fiber cable network includes one or more fiber slots, each fiber slot housing a transmitter or receiver for interfacing with a head end. The node also includes one or more coax slots each housing an RF brick for interfacing with subscribers. One or more RF plug-in modules provide connectivity between the fiber slots and the coax slots. The RF plug-in modules include a plurality of connection points, such that each connection point is connected to a fiber slot or a coax slot.

A fiber impedance element is connected to each of the fiber slots. Each fiber impedance element is associated with the transmitter or receiver in that fiber slot. Each fiber impedance element in the node has a different impedance value. A coax impedance element is connected to each of the coax slots. Each coax impedance element is associated with the RF brick in that coax slot. Each coax impedance element in the node has a different impedance value. An impedance sensing circuit detects a DC level associated with each of the connection points of the RF plug-in modules. The DC level corresponds with the impedance element in a respective fiber or coax slot. Determination of the impedance element for a particular slot allows determination of the slot location of transmitters, receivers or RF amplifiers for a given nodal configuration.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
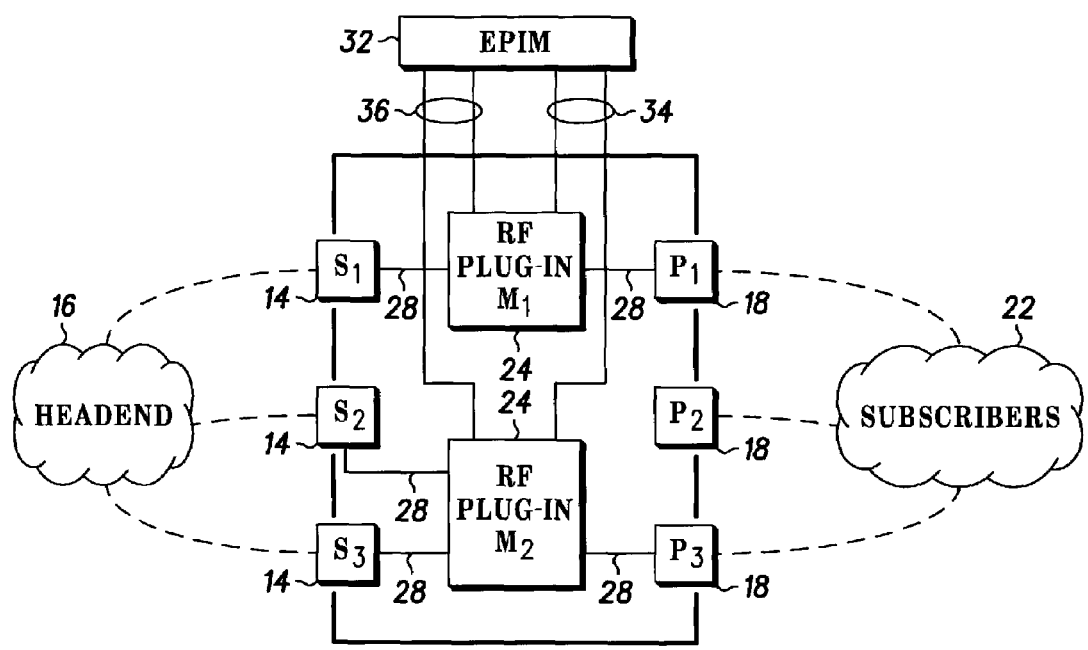
FIG. 1 is a block diagram of a reconfigurable node in an HFC network according to a preferred embodiment of the present invention.
Figure 2:
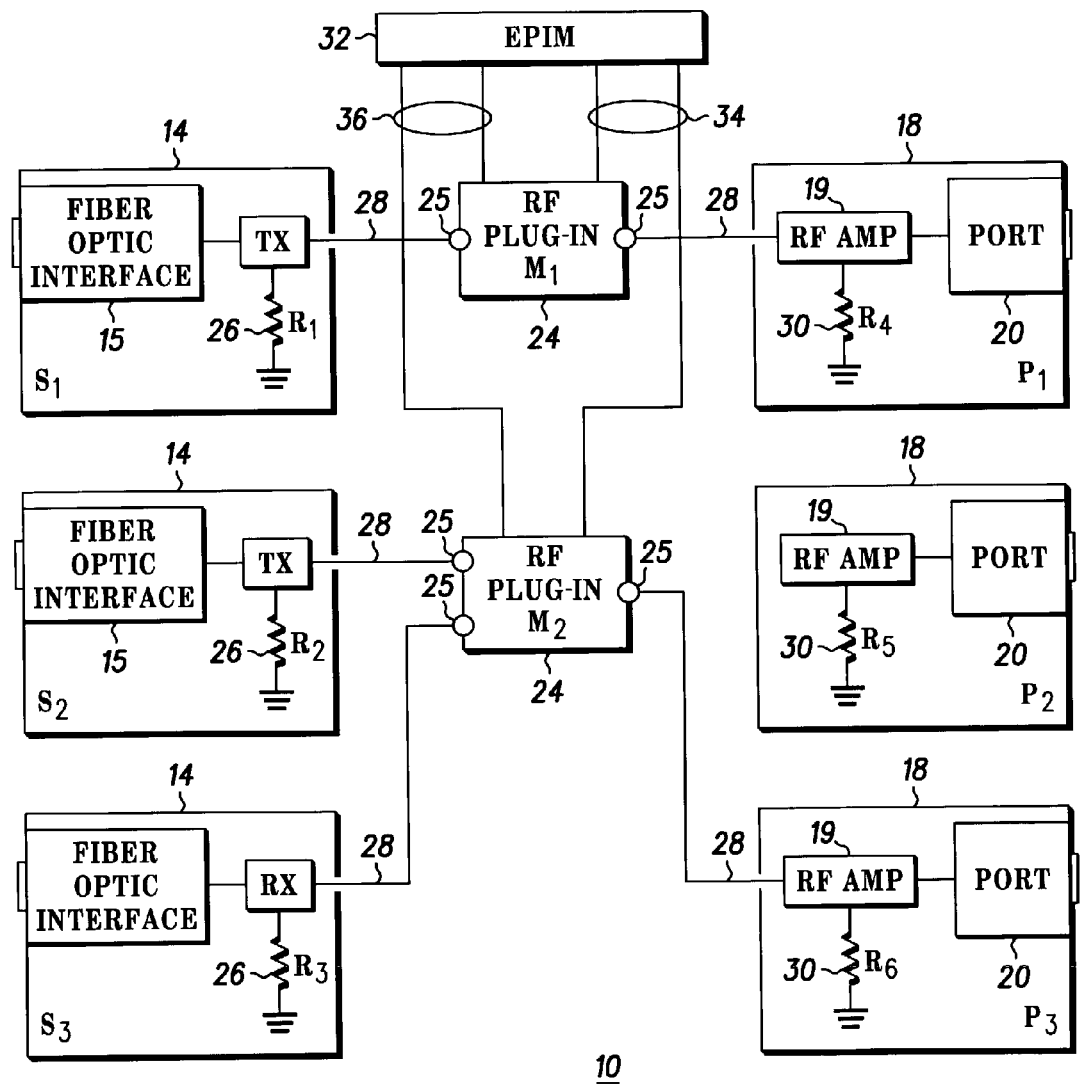
FIG. 2 is an enlarged block diagram of the reconfigurable node of FIG. 1.
Figure 3:
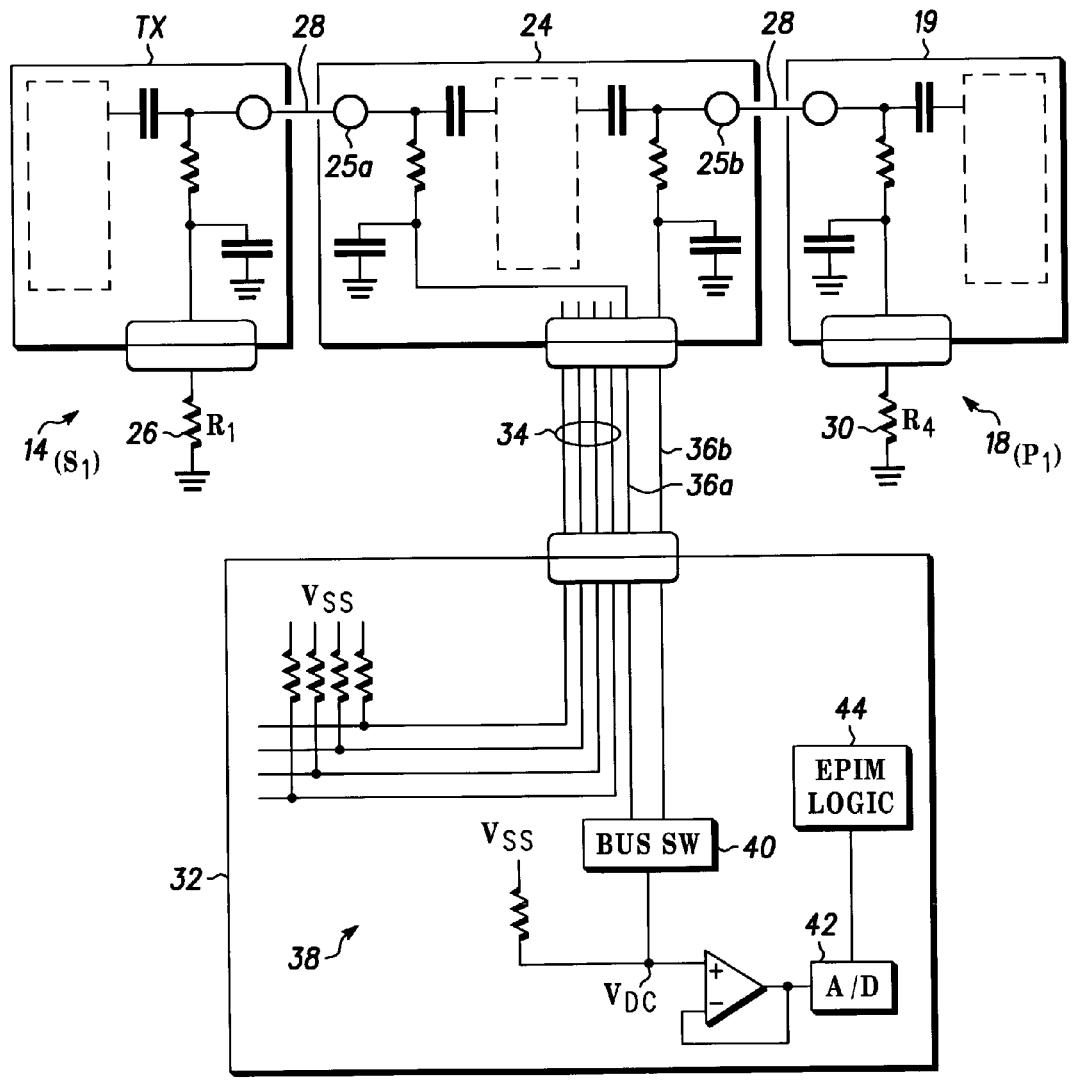
FIG. 3 is a block diagram of an RF signal path through a portion of the node of FIG. 1.

Referring to the drawings in detail, wherein like numerals indicate like elements throughout, there is shown in FIGS. 1–3 a preferred embodiment of a reconfigurable node 10 for an HFC network in accordance with the present invention. The reconfigurable node 10 includes one or more fiber slots 14 on the side of the node 10 interfacing with the head end 16. In the embodiment of FIGS. 1–3, the node 10 includes three fiber slots 14 (designated as $S_1$, $S_2$ and $S_3$). However, the node 10 may be configured to include any number of fiber slots 14, $S_1$–$Sn$, without departing from the spirit and scope of the present invention. Each fiber slot 14 includes a transmitter TX, or receiver RX, which interfaces though a fiber optic interface 15 with the head end 16. The head end 16 sends and/or receives information to/from the node 10 via the transmitters and receivers TX, RX in the fiber slots 14.

Similarly, the node 10 includes one or more coax slots 18 on the side of the node 10 interfacing with the subscribers 22. In the embodiment of FIGS. 1–3, the node 10 includes three coax slots 18 (designated as $P_1$, $P_2$ and $P_3$). However, the node 10 may be configured to have any number of coax slots 18, $P_1$–$Pn$. As shown in FIG. 2, each coax slot 18 includes an RF brick 19 which interfaces via a port 20 with the subscribers 22. The RF brick 19 amplifies RF signals output from the node 10 to the subscribers 22, and filters RF signals input to the node 10 from the subscribers 22. Information which passes between the node 10 and the subscribers 22 is passed through the coax slots 18. Thus, information is passed bi-directionally between the head end 16 and the subscribers 22 via the node 10.

The node 10 includes one or more RF plug-in modules 24 which provide connectivity between the fiber slots 14 and the coax slots 18. Each RF plug-in module 24 has two or more connection points 25 (see FIGS. 2 and 3). Each connection point 25 is an input or an output for the RF plug-in module 24 and connects to either a fiber slot 14 or a coax slot 18 using an RF cable 28. An RF plug-in module 24 may connect to more than one fiber slot 14, and may connect to more than one coax slot 18. Thus, the number and location of the connection points 25 on each RF plug-in module 24 depends upon the configuration (i.e., the number and location of connections to the fiber and coax slots 14, 18) of the RF plug-in module 24. The node 10 may utilize more than one configuration of RF plug-in module 24 at any given time. For example, in the embodiment of FIGS. 1–3, one RF plug-in module 24 ($M_1$) has one input from a coax slot 14 ($P_1$) and one output to a fiber slot 18 ($S_1$). A second RF plug-in module 24 ($M_2$) has one input from a fiber slot 14 ($S_3$), and two outputs, one to a fiber slot 14 ($S_2$) and one to a coax slot 18 ($P_3$). The RF plug-in modules 24 may also be of different types. That is, the RF plug-in modules 24 may utilize various pathway connections of switches, splitters or amplifiers to condition or otherwise change the signal input to the RF plug-in module 24 from the fiber slots 14. The node 10 may be configured such that the RF plug-in modules 24 are all identical, or may be configured such that no two RF plug-in modules 24 are alike. The node 10 is designed such that the RF plug-in modules 24 may be interchanged with each other or completely removed from the node 10 and replaced with a different RF plug-in module 24 having a completely different configuration than any of the RF plug-in modules 24 previously connected within the node 10.

A fiber impedance element 26 is connected to each fiber slot 14. The fiber impedance elements 26 are preferably resistors, and each fiber slot 14 preferably has a fiber impedance element 26 having an impedance value which is different than that of the other fiber impedance elements 26 connected to the other fiber slots 14 in the node 10. For example, as shown in FIGS. 2 and 3, the fiber impedance elements 26 have impedance values $R_1$, $R_2$, $R_3$, so that each individual fiber slot 14 is unique. The number of fiber impedance elements 26 in the node 10 corresponds to the number of fiber slots 14, such that the fiber impedance elements 26 may have impedance values $R_1$–Rn. Each fiber impedance element 26 is associated with the transmitter or receiver TX, RX which occupies the same fiber slot 14. The fiber impedance elements 26 associated with the transmitter or receiver TX, RX in each fiber slot 14 are used to identify which fiber slots 14 of the node 10 are occupied by a transmitter or receiver TX, RX and thus connected to a particular RF plug-in module 24 at a particular connection point 25.

A coax impedance element 30 is connected to each coax slot 18. The coax impedance elements 30 are preferably resistors, and each coax slot 18 preferably has a coax impedance element 30 having an impedance value which is different than that of the other coax impedance elements 30 connected to the other coax slots 18 in the node 10. For example, as shown in FIGS. 2 and 3, the coax impedance elements 30 have impedance values $R_4$, $R_5$, $R_6$, to indicate that each individual coax slot 18 is unique. However, a coax impedance element 30 may have an impedance value which is the same as an impedance value of a fiber impedance element 26. The number of coax impedance elements 30 in the node 10 corresponds to the number of coax slots 18, such that the coax impedance elements 30 may have impedance values $R_1$–Rn. Each coax impedance element 30 is associated with the RF brick 19 which occupies the same coax slot 18. The coax impedance elements 30 associated with each coax slot 18 are used to identify which coax slots 18 of the node 10 are occupied by an RF brick 19 and thus connected to a particular RF plug-in module 24 at a particular connection point 25.

As shown in FIGS. 1–3, an embedded plug-in module, or EPIM 32 is connected to the RF plug-in modules 24 via the data lines 34 and the impedance sensing lines 36. Each type or configuration of RF plug-in module 24 has a unique identifying code, depending on the number and location of inputs and outputs thereon and the function of the RF plug-in module 24. The EPIM 32 reads the identifying code from each of the RF plug-in modules 24 which is present in the node 10 to determine the number and location of the connection points 25 and the signal path connectivity for each RF plug-in module 24 in that node 10. The EPIM 32 preferably utilizes a separate set of data lines 34 for each RF plug-in module 24.

The EPIM 32 includes an impedance sensing circuit 38 (see FIG. 3). The impedance sensing circuit 38 detects a DC voltage level ("$V_{DC}$") associated with each connection point 25 on the RF plug-in modules 24 to determine the slot location of the transmitters and receivers TX, RX and the RF bricks 19 in the node 10. As shown in FIG. 3, the impedance sensing lines 36 connect the impedance sensing circuit 38 to the connection points 25 in each RF plug-in module 24, and thus to each fiber slot 14 and coax slot 18 to which an RF plug-in module 24 is connected. The EPIM 32 preferably utilizes a separate set of impedance sensing lines 36 for each RF plug-in module 24. If a fiber slot 14 or coax slot 18 has a corresponding transmitter, receiver TX, RX or RF brick 19 therein, the impedance sensing circuit 38 is thus connected to each of the respective impedance elements 26, 30, and a simple resistor circuit from the EPIM 32 to the impedance element 26, 30 is formed. By way of a simple voltage divider calculation, the EPIM 32 determines, based on $V_{DC}$, which of the slots 14, 18 having an element therein are connected to which of the connection points 25 on an RF plug-in module 24. If a slot 14, 18 does not have a transmitter, receiver TX, RX or RF brick 19 associated with the slot's respective impedance element 26, 30, no circuit will be completed between the slot 14, 18 and the EPIM 32.

How the EPIM 32 determines configuration information about the reconfigurable node 10 is demonstrated through the example of the preferred embodiment shown in FIGS. 1–3. The reconfigurable node 10 has two RF plug-in modules 24, designated $M_1$ and $M_2$. The RF plug-in module $M_1$ has two connection points 25, one for connection to the fiber slot 14 ($S_1$), and one for connection to the coax slot 18 ($P_1$). The fiber slot $S_1$ contains a transmitter TX, and is associated with a fiber impedance element 26 having an impedance value of $R_1$. The coax slot $P_1$ has an RF brick 19, and is associated with a coax impedance element 30 having an impedance value of $R_4$. Additionally, the RF plug-in module $M_2$ has three connection points 25. Two connection points 25 connect to the fiber slots $S_2$, $S_3$, which contain a transmitter TX and a receiver RX, respectively, and are associated with fiber impedance elements 26 having fiber impedance values of $R_2$ and $R_3$, respectively. The third connection point 25 for the RF plug-in module $M_2$ connects to the coax slot $P_3$, and is associated with a coax impedance element 30 having a coax impedance value R6. In this example, the coax slot $P_2$ is not connected to the node 10.

As discussed above, the impedance values $R_1$, $R_4$ need not be different. Rather, it is only necessary that the impedance values $R_1$, $R_2$ and $R_3$ of the fiber impedance elements 26 in the fiber slots $S_1$, $S_2$, $S_3$ are different from each other. Similarly, it is only necessary that the impedance values $R_4$, $R_5$ and $R_6$ of the coax impedance elements 30 in the coax slots $P_1$, $P_2$, $P_3$ are different from each other.

To determine the slot location of the transmitters, receivers TX, RX and RF bricks 19 in the node 10, the EPIM 32 reads the identifying code on the first RF plug-in module 24 by reading the set of data lines 34 which connect to the RF plug-in module $M_1$ to determine the type and configuration of the RF plug-in module 24. In the present example, the RF plug-in module 24 ($M_1$) has one input and one output (i.e., two connection points 25), and passes the signal input to the node 10 via the coax slot 18 ($P_1$) directly through to the output via the fiber slot 14 ($S_1$) without any further manipulation of the signal. Upon identifying the RF plug-in module $M_1$, the EPIM 32 determines that there are only two connection points 25a, 25b in the RF plug-in module $M_1$ (see FIG. 3). Thus, the EPIM 32 determines that only two $V_{DC}$ measurements are required to determine slot locations associated with the RF plug-in module $M_1$. Note that only the data lines 34 and impedance sensing lines 36 specific to the RF plug-in module $M_1$ are shown in FIG. 3.

To determine which fiber slot 14 or coax slot 18 is connected to a particular connection point 25a, 25b on the selected RF plug-in module $M_1$, the impedance sensing circuit 38 makes a $V_{DC}$ measurement corresponding to each connection point 25a, 25b. Via the bus switch 40, the EPIM 32 selects the impedance sensing line 36 connected to the desired connection point 25, thereby associating $V_{DC}$ with whichever slot 14, 18 is connected to that particular connection point 25. In the present example, the bus switch 40 first selects the impedance sensing line 36a, such that $V_{DC}$ is associated with the connection point 25a connected to the fiber slot $S_1$. Thus, the impedance sensing circuit 38 is connected to the resistor circuit running through the connection point 25a and terminating in the fiber slot $S_1$ (see FIG. 3). Since the EPIM 32 knows the configuration of the RF plug-in module $M_1$ by way of reading the data lines 34 associated with the RF plug-in module $M_1$, the EPIM 32 knows that $V_{DC}$ corresponds to a fiber slot 14 (in this case S1), and not a coax slot 18. Further, the EPIM 32 will not associate $V_{DC}$ with the other fiber slots $S_2$, $S_3$ (which are connected to the RF plug-in module $M_2$) since only the connections associated with the RF Plug-in module $M_1$ are initially examined by the EPIM 32.

The measurement at $V_{DC}$ is an analog voltage which is amplified or buffered and input to an A/D converter 42. A digital output value corresponding to the analog value input to the A/D converter 42 is thus assigned to the $V_{DC}$ which was measured for the connection point 25a.

The values of the resistors shown in the circuitry of FIG. 3 are all known, as are the impedance values $R_1$–$R_6$ of all the impedance elements 26, 30. Knowing $V_{DC}$ allows a simple voltage divider calculation by the EPIM logic 44 to determine the value of the impedance element 26 which is associated with the connection point 25a and connected to the impedance sensing circuit 38. Thus, based on the digital value of $V_{DC}$, the EPIM 32 determines the corresponding impedance value of the impedance element 26 for the fiber slot 14 which is connected to the connection point 25a for which $V_{DC}$ was measured. Since the EPIM 32 also knows which fiber slots 14 and coax slots 18 correspond to which particular impedance elements 26, 30, the EPIM logic 44 also determines which fiber slot 14 is connected to the connection point 25a. In the present example, the EPIM 32 knows that the fiber impedance value $R_1$ corresponds to fiber slot $S_1$. Thus, when the EPIM 32 determines that $V_{DC}$ corresponds to impedance value $R_1$, the EPIM 32 also determines that the fiber slot $S_1$ is connected to the connection point 25a of selected the RF plug-in module $M_1$.

Once the identity of the fiber slot 14 connected to the connection point 25a has been determined, the bus switch 40 connects the impedance sensing circuit 38 to the impedance sensing line 36b to similarly determine $V_{DC}$ corresponding to the connection point 25b in the selected RF plug-in module 24 $M_1$. In the present example, since the RF plug-in module $M_1$ only has two connection points 25a, 25b, the next $V_{DC}$ measurement represents the coax slot 18 connected to the connection point 25b, and corresponds to the coax impedance value $R_4$. Therefore, the EPIM associates the coax slot $P_1$ with the connection point 25b.

The process repeats for the remaining RF plug-in modules 24 in the node 10. In the present example, the EPIM 32 next examines the connections associated with the RF plug-in module $M_2$ by reading the set of data lines 34 which connect to the RF plug-in module $M_2$. The EPIM 32 determines that there are three connection points 25 (see FIG. 2), and thus makes three $V_{DC}$ measurements. The EPIM 32 also knows that the RF plug-in module $M_2$ has two connection points 25 associated with fiber slots 14 and one connection point 25 associated with a coax slot 18. In the manner described above, the EPIM 32 then determines which of the fiber slots 14 and coax slots 18 are connected to the RF plug-in module $M_2$. Thus, the slot location of transmitters, receivers TX, RX and RF bricks 19 is determined by using the EPIM 32 to determine which particular slot 14, 18 is connected to each respective connection point 25 of a particular RF plug-in module 24.

Once the EPIM 32 identifies which fiber slots 14 and coax slots 18 are connected to each connection point 25 of each individual RF plug-in module 24 in the node 10, the EPIM 32 then also knows the various RF signal paths through the node 10. This is because, as discussed above, the type and configuration of each of the RF plug-in modules 24 present in the node 10 is also known. The EPIM 32 reports this information of the signal path from the head end 16 to the subscribers 22 through the node 10 to the element management system of the HFC network. The HFC network which uses the reconfigurable node 10 is therefore HMS compliant since the signal paths through each of the nodes 10 in the HFC network are accurately reported to the network element management system.

Because the node 10 is reconfigurable, a user can interchange the transmitters and receivers TX, RX between the various fiber slots 14. Since the fiber slots 14 are uniquely identified by a fiber impedance element 26, it does not matter into which individual fiber slot 14 a particular transmitter or receiver TX, RX is placed. Similarly, since the EPIM 32 determines the type and configuration of an RF plug-in module 24 placed in a given location within the node 10, any slot or combination of slots 14, 18 may be connected via the connection points 25 to any individual RF plug-in module 24 depending on the number of available connection points 25 for that particular RF plug-in module 24. Since the EPIM 32 determines the slot locations of each of the transmitters or receivers TX, RX in the fiber slots 14 and the RF bricks 19 in the coax slots 18, the reconfigurable node 10 remains HMS compliant even if the user later reconfigures the node 10 by changing the RF plug-in modules 24 and/or the transmitters or receivers TX, RX in the fiber slots 14 or the RF bricks 19 in the coax slots 18.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A reconfigurable node for a hybrid fiber cable network, the node including (i) one or more fiber slots each housing a transmitter or receiver for interfacing with a head end, (ii) one or more coax slots each housing an RF brick for interfacing with subscribers; (iii) one or more RF plug-in modules for providing connectivity between the one or more fiber slots and the one or more coax slots, the RF plug-in modules including a plurality of connection points, each connection point being connected to a fiber slot or a coax slot, the node comprising:

(a) a fiber impedance element connected to each of the fiber slots, each fiber impedance element associated with the transmitter or receiver in that fiber slot, each fiber impedance element having a different impedance value;

(b) a coax impedance element connected to each of the coax slots, each coax impedance element associated with the RF brick in that coax slot, each coax impedance element having a different impedance value; and (c) an impedance sensing circuit to detect a DC level associated with each of the connection points of the one or more RF plug-in modules, wherein the DC level corresponds with the impedance element in a respective fiber or coax slot, for determining slot location of transmitters, receivers or RF bricks in a given configuration of the node.

2. The reconfigurable node according to claim 1, wherein the node is HMS compliant and reports a signal path from input to output of the node.

3. The reconfigurable node according to claim 1, wherein at least two different types of RF plug-in modules are used.

4. The reconfigurable node according to claim 1, wherein an embedded plug-in module determines the type and configuration of the one or more RF plug-in modules and the slot location of the transmitters, receivers or RF bricks.

5. The reconfigurable node according to claim 1, wherein the RF bricks include an amplifier.

* * * * *

UNITED STATES PATENT AND TRADEMARK OFFICE
CERTIFICATE OF CORRECTION

| | | |
|---|---|---|
| PATENT NO. | : 7,039,317 B2 | Page 1 of 1 |
| APPLICATION NO. | : 10/304595 | |
| DATED | : May 2, 2006 | |
| INVENTOR(S) | : Marlin McGregor | |

It is certified that error appears in the above-identified patent and that said Letters Patent is hereby corrected as shown below:

Column 1,

Line 49, after "signal path through the", insert --nodes--.

Signed and Sealed this

Fourth Day of July, 2006

JON W. DUDAS
*Director of the United States Patent and Trademark Office*